(12) United States Patent
Thamm

(10) Patent No.: US 10,760,966 B2
(45) Date of Patent: Sep. 1, 2020

(54) METHOD FOR THE CORRECTION OF BACKGROUND SIGNALS IN A SPECTRUM

(71) Applicant: Analytik Jena AG, Jena (DE)

(72) Inventor: Eike Thamm, Stradtroda (DE)

(73) Assignee: Analytik Jena AG, Jena (DE)

( * ) Notice: Subject to any disclaimer, the term of this patent is extended or adjusted under 35 U.S.C. 154(b) by 133 days.

(21) Appl. No.: 15/093,398

(22) Filed: Apr. 7, 2016

(65) Prior Publication Data

US 2016/0299004 A1 Oct. 13, 2016

(30) Foreign Application Priority Data

Apr. 7, 2015 (DE) .......................... 10 2015 105 239

(51) Int. Cl.
| | | |
|---|---|---|
| *G01J 3/02* | (2006.01) | |
| *G01J 3/28* | (2006.01) | |
| *H01J 49/02* | (2006.01) | |

(52) U.S. Cl.
CPC ............... *G01J 3/0297* (2013.01); *G01J 3/28* (2013.01); *H01J 49/022* (2013.01); *G01J 2003/2859* (2013.01); *G01J 2003/2869* (2013.01)

(58) Field of Classification Search
CPC .... G01J 3/0297; G01J 3/28; G01J 2003/2859; G01J 2003/2869; H01J 49/022
See application file for complete search history.

(56) References Cited

U.S. PATENT DOCUMENTS

| | | | | |
|---|---|---|---|---|
| 5,719,796 A | * | 2/1998 | Chen ....................... | H01L 22/20 257/E21.525 |
| 5,910,838 A | | 6/1999 | Weisse | |

(Continued)

FOREIGN PATENT DOCUMENTS

| | | | |
|---|---|---|---|
| DE | 10055905 A1 | 5/2002 | |
| WO | WO 2014/094039 | * 6/2014 | ............. G01N 21/93 |

OTHER PUBLICATIONS

DeGroot, Morris H. Probability and Statistics. USA, Addison Wesley, 1975, pp. 12-15, 144, 157, 162-163, 167 (Year: 1975).*

(Continued)

*Primary Examiner* — Ajay Ojha
(74) *Attorney, Agent, or Firm* — Thorpe North & Western, LLP

(57) ABSTRACT

A method for the determination and correction of background signals in a spectrum, consisting of signals of a plurality of spectral points, characterized by the steps of: Calculating at least three statistic or analytic functions of the signal values of the spectrum, attributing probabilities $P_i(band)$ for the presence of bands to each point in each of the calculated functions: Adding the probabilities $P_i(band)$ up to an overall probability $\Sigma P_i(band)$ from all calculated functions for each point; calculating a probability P(background) for the presence of background for each point in the spectrum from said overall probability $\Sigma P_i(band)$ according to $P(background)=1-\Sigma P_i(band)$ wherein negative values are set to zero; and calculating a fit of the signal values at all points of the original spectrum wherein the signal in each point is taken into account in the fit only with the respective probability for the presence of background P(background), and subtraction of the background function determined in such a way from the signal values of the original spectrum in order to generate a background corrected spectrum.

12 Claims, 12 Drawing Sheets

$$\text{Mean} = \bar{x} = \frac{1}{N}\sum_{j=0}^{N-1} x_j \quad (1)$$

$$\text{Variance} = \frac{1}{N-1}\sum_{j=0}^{N-1}(x_j - \bar{x})^2 \quad (2)$$

$$\text{Skewness} = \frac{1}{N}\sum_{j=0}^{N-1}\left(\frac{x_j - \bar{x}}{\sqrt{\text{Variance}}}\right)^3 \quad (3)$$

$$\text{Kurtosis} = \frac{1}{N}\sum_{j=0}^{N-1}\left(\frac{x_j - \bar{x}}{\sqrt{\text{Variance}}}\right)^4 - 3 \quad (4)$$

(56) References Cited

U.S. PATENT DOCUMENTS

| | | | | |
|---|---|---|---|---|
| 8,737,550 B1* | 5/2014 | Jonsson | ............. | H04L 25/0202 |
| | | | | 375/350 |
| 2004/0248317 A1* | 12/2004 | Swamy | ............. | G01N 33/6842 |
| | | | | 436/173 |
| 2006/0255249 A1 | 11/2006 | Liu | | |
| 2016/0223646 A1* | 8/2016 | Samaniego | ........... | G01S 13/885 |

OTHER PUBLICATIONS

Christopher Rowlands and Stephen Elliott, Automated algorithm for baseline subtraction in spectra, Journal of Raman Spectroscopy, Wiley Online Library, May 13, 2010.

* cited by examiner $$\text{Mean} = \bar{x} = \frac{1}{N}\sum_{j=0}^{N-1} x_j \quad (1)$$

$$\text{Variance} = \frac{1}{N-1}\sum_{j=0}^{N-1}(x_j - \bar{x})^2 \quad (2)$$

$$\text{Skewness} = \frac{1}{N}\sum_{j=0}^{N-1}\left(\frac{x_j - \bar{x}}{\sqrt{\text{Variance}}}\right)^3 \quad (3)$$

$$\text{Kurtosis} = \frac{1}{N}\sum_{j=0}^{N-1}\left(\frac{x_j - \bar{x}}{\sqrt{\text{Variance}}}\right)^4 - 3 \quad (4)$$

Fig. 1

METHOD FOR THE CORRECTION OF BACKGROUND SIGNALS IN A SPECTRUM

TECHNICAL FIELD

The invention relates to a method for the determination and correction of background signals in a spectrum consisting of signals of a plurality of spectral points.

Spectral analysis is one of the oldest methods for the investigation of solid, liquid or gaseous substances. It is a fundamental physical method which is successfully applied in many ranges such as, for example, astronomy, biology, chemistry and medicine. It uses the fact that all bodies interact with electromagnetic radiation. Natures of such interactions are emission, absorption, scattering and reflection of radiation. Devices for carrying out a spectral analysis are called spectrometer.

Each spectrometer has a dispersing element which influences electromagnetic radiation depending on a physical parameter to a different extent. Such parameter can be, for example, the wavelength λ, the frequency v, or the energy E. By influencing the radiation as a function of the parameter, the radiation is spread and a spectrum is generated. Such a spectrum can be visualized, graphically recorded or be stored by means of the electronic data processing. Spectrometers are distinguished according to their design and their application: if matter is influenced by electric or magnetic fields they are mass spectrometers. If electromagnetic energy is influenced by material components they are called optical spectrometers. The influencing elements have in both cases equivalent names, such as, for example, ion lens/optical lens, ion mirror/optical mirror. Substances are identified with mass spectrometers due to the properties of their nucleus, with optical spectrometers substances are identified due to processes in the atomic shell. As far as substances or bodies shall be investigated with a spectrometer which do not represent an emission source themselves, the respective spectrometer has a so-called ionization or excitation source.

An optical spectrum is a continuous distribution of the electromagnetic radiation energy S or the intensity I as a function of the wavelength λ or the frequency v. Characteristic features and structures in a spectrum enable conclusions regarding the source of the radiation and changes which occurred on its way to the detection in the spectrometer. The most important structures in a spectrum are the so-called bands. They are local maxima or local minima of the signal values, for example of the radiation energy S or the intensity I, on an otherwise only weak or non-structured background. If it is maxima, the spectrum is called an emission spectrum, if minima occur, it is called absorption spectrum. Such structures are called "peaks" in Anglo-Saxon literature.

It is an object of the spectral analysis t derive the origin and from this in turn the composition of the radiating body or substance in an emission spectrum or of the transmitted body or substance in an absorption spectrum using the position of such peaks in the spectrum and its relative strength. The quality of the spectral analysis increases with the accuracy with which the position and the strength of a peak can be determined. For this purpose it is necessary to determine the background always present as good as possible because each spectrum can be represented mathematically by a linear combination of background, one or more peaks, and a noise portion.

The background signal in a spectrum is caused by different processes. There is a portion originating from thermal radiation, i.e., a continuous distribution of the velocity of atoms or molecules of the investigated body or substance. There are additional portions originating in the spectrometer itself. This comprises in particular, but not exclusively, the dark current of the used detector.

PRIOR ART

With known methods for background correction the background is determined and subtracted from the signal afterwards.

DE 100 55 905 A1 discloses a method for the background correction in two-dimensional Echelle-spectra. Straylight and dark current of the detector are determined by measuring the intensity between the orders. Otherwise the background is determined by smoothing the curve by multiple application of a moving average. Values above the curse will be set to the value of the smoothed curve. The peaks will shrink with the number of operations while the remainder of the smoothed curve will fit to the original curve. The background calculated in such a way is subtracted from the original curve.

DE 196 17 100 B4 discloses a method for background correction where a function is fitted to the local minima.

DISCLOSURE OF THE INVENTION

It is an object of the invention to provide a device of the above mentioned kind, which enables an automatic and reproducible background correction with high accuracy.

According to the invention this object is achieved by a method with the steps of
 (a) calculating at least three functions of the signal values of the spectrum, wherein such functions are selected from:
  (A) mean
  (B) variance
  (C) skewness
  (D) kurtosis
  (E) moving average with a window width of 3 points
  (F) second derivative
  (G) median
  (H) maximum
  (I) minimum
  (J) difference between maximum and minimum
  (K) quotient of the central signal value and the mean value
  (L) quotient (maximum-mean value)/(maximum-minimum):
 (b) attributing probabilities $P_i$(band) for the presence of bands (20) to each point in each of the calculated functions;
 (c) Adding the probabilities $P_i$(band) up to an overall probability $\Sigma P_i$(band) from all calculated functions for each point;
 (d) calculating a probability P(background) for the presence of background for each point in the spectrum from said overall probability $\Sigma P_i$(band) according to $$P(\text{background})=1-\Sigma P_i(\text{band})$$

wherein negative values are set to zero;
 (e) calculating a fit (34) of the signal values at all points of the original spectrum wherein the signal in each point is taken into account in the fit only with the respective probability (32) for the presence of background P(background), and (f) subtraction of the background function determined in such a way from the signal values of the original spectrum in order to generate a background corrected spectrum.

A point therein is a value on the abscissa and can correspond to, for example, the image points on a detector (detector element, pixel), a wavelength interval, frequency interval or a mass.

The signal value is a value on the ordinate and may correspond to the intensity of an emission or absorption or an intensity in a mass spectrometer.

Contrary to known methods a probability is calculated with the method according to the present invention which indicates whether a signal is part of the background. The background signal determined with any spectrometer assembly, can be automatically and reliably quantified. Thereby, the recognition of bands and peaks is improved. Since the background signal is determined automatically it is independent from the opinion of the staff and can be determined quickly, reproducibly and reliably.

The method uses the finding that background signals in spectra are continuous and continuously differentiable and can be described by a continuously differentiable function. Examples for such functions are polynomials.

The method makes use of a selection of different functions (A) to (L). Consecutively to each point a window with always the same width is attributed. This is, for example, a window with 9 points. Four points are positioned on the left side of the center. Four points are positioned on the right side of the center and the point in the center is also counted. Windows having a width with an odd number of points are preferred because they have a point in the center which may be necessary with some functions. For each point of the spectrum as a center point the following is calculated:

(A) mean (moving average): This is the 1st statistical momentum and is calculated according to formula (1) in FIG. 1.

(B) variance: This is the 2nd statistical momentum and is calculated according to formula (2) in FIG. 1.

(C) skewness This is the 3rd statistical momentum and is calculated according to formula (3) in FIG. 1.

(D) kurtosis: This is the 4th statistical momentum and is calculated according to formula (4) in FIG. 1.

(E) moving average with a window width of 3 points: This is a special case of (A) with a window width of 3 points.

(F) second derivative: This is a function of the differential calculus here the curvature of a curve is described and calculated according to:

$$f''=d^2x/dx^2$$

(G) median: this is a signal value which is found in the center after listing all signal values if the values are sorted according to their size.

(H) maximum: This is the largest signal value in the respective window.

(I) minimum: This is the smallest signal value in the respective window.

(J) difference between maximum and minimum: This is the value which is obtained by subtracting the smallest signal value of the respective window from the largest signal value.

(K) quotient of the central signal value and the mean value: This is the value which is obtained if the value at the center of the window is divided by the average value.

(L) quotient (maximum-mean value)/(maximum-minimum): This is the value which is obtained if the difference between maximum and average value is divided by the difference between the maximum and the minimum.

All functions describe properties of the spectral distribution. A combination of three of such functions, preferably five, is sufficient to obtain sufficient information for the determination of the background distribution. Preferably such functions are calculated at least for two different window widths. Afterwards, probabilities $P_i$(band) for the presence of a band are attributed to each point. A high probability is, for example, attributed to a range where there is a peak and can be expressed as a number approximately 1-100%. For the calculation of the probabilities one of the selected functions (A) to (L) are used, respectively. A corresponding probability spectrum is derived for each of the selected functions.

Furthermore, the method according to the present invention provides that the probabilities $P_i$(band) determined in such a way are summed up to an overall probability $\Sigma P_i$(band) from all functions on each of the points. The sum is calculated pointwise. An overall probability spectrum is obtained for the various probability spectra.

The overall probability spectrum can be inverted to a spectrum representing the probability for the presence of background. This is effected according to:

$$P(\text{background})=1-\Sigma P_i(\text{band})$$

The larger the probability that a point belongs to a band or peak the smaller is the probability that the signal on such a point belongs to the background. Since the sum of the probabilities may add up to a value which is larger than 1 there is a possibility that negative values P(background) are obtained. They are set to zero. In other words: There is a band or peak on this point anyway.

A background function is determined by a fit through the signal values on all points of the original spectrum. The signal on each point is only taken into account only with the respective probability for the presence of background P(background) for the calculation of the fit. A point, where it is certain that a band is present, will, therefore, be entirely neglected. A point where it is certain that there is no hand or peak present, will be taken into account with its full value. Contrary to known methods, values where a probability therebetween must be assumed will be taken into account with such a reduced probability. This means that the probability P(background) is used as a weight for all points of the spectrum when the background function (fit) is mathematically determined.

Afterwards the once found background function is subtracted from the signal values and the background-corrected spectrum with analytically interesting bands and peaks remains.

In a particularly preferred embodiment of the invention the values of the calculated function are normalized by division by the mean value of the corresponding function values over all points. This step is preferably carried out immediately after the functions (A) to (L) or the selected functions are calculated. Normalized spectra are obtained.

In a preferred modification of the present invention the probabilities $P_i$(band) for the presence of bands are calculated by attributing a probability to each point having a parameter above or below a threshold, in particular above 1.3 and below 0.7, the attributed probability being proportional to the distance of the parameter from said threshold. The threshold S is generally in the range of 1, but other thresholds are, of course, also possible. Alternative embodiments use different calculation methods for the calculation of the probability.

Preferably, the probabilities $P_i(\text{hand})$ are multiplied by a factor $\alpha_i$ before calculating the overall probability in such a way that the following equation applies:

$$P(\text{background})=1-\Sigma\alpha_i P_i(\text{band})$$

The use of a weight factor enables that functions having a higher relevance when bands or peaks are determined than others will be considered with a higher weight in the calculation than functions which are of minor significance.

In a modification of the invention the fit of the signal values on all points of the original spectrum is effected by means of a fit-function and the method of least squares. With such a method the square of the difference with the fit function is determined for each point. The sum of the squares of the differences is a measure for the quality of the fit function. Accordingly, the fit function can be optimizes until it adequately represents the background function.

In a further modification of the invention several fit functions of different type are used and the one with the smallest deviation of the least squares is selected. For example, the logarithmic values of the values on one or both axes can be used for optimizing the fit function. In any case each point will always be taken into account for the calculation only with its own probability.

For example, a polynomial can be used as a fit function for the fit of all points of the original spectrum. A linear function having the form y=a+bx may be sufficient already, where each point is considered with its probability. Furthermore, it can be checked if a preceding coordinate transformation having the form x→log x and/or y→log y will provide a higher quality of the fit function.

In a particularly preferred embodiment of the invention the method is carried out a plurality of times for at least two different window widths, preferably for window widths having 5, 9, 13 and 17 points and the one with the smallest deviation of the least squares is selected as a fit function. Depending on the width of the bands or peaks and the spectral distribution different window widths will provide different results. The functions (A) to (L) are separately calculated for each window width.

In a particularly preferred modification of the invention the following functions are selected:
(A) mean
(B) variance
(E) moving average with a window width of 3 points
(F) second derivative
(G) median
(H) maximum
(J) difference between maximum and minimum
(K) quotient of the central signal value and the mean value
and preferably only the functions
(A) mean
(B) Variance
(E) moving average with a window width of 3 points
(F) second derivative
(G) median
(H) maximum.

Such functions will already provide very good results.

Modifications of the invention are subject matter of the subclaims. An embodiment is described below in greater detail with reference to the accompanying drawings.

BRIEF DESCRIPTION OF THE DRAWINGS

FIG. 1 lists the first four statistic momentums and the formula for their calculation.

DESCRIPTION OF THE EMBODIMENT

Figure 2:
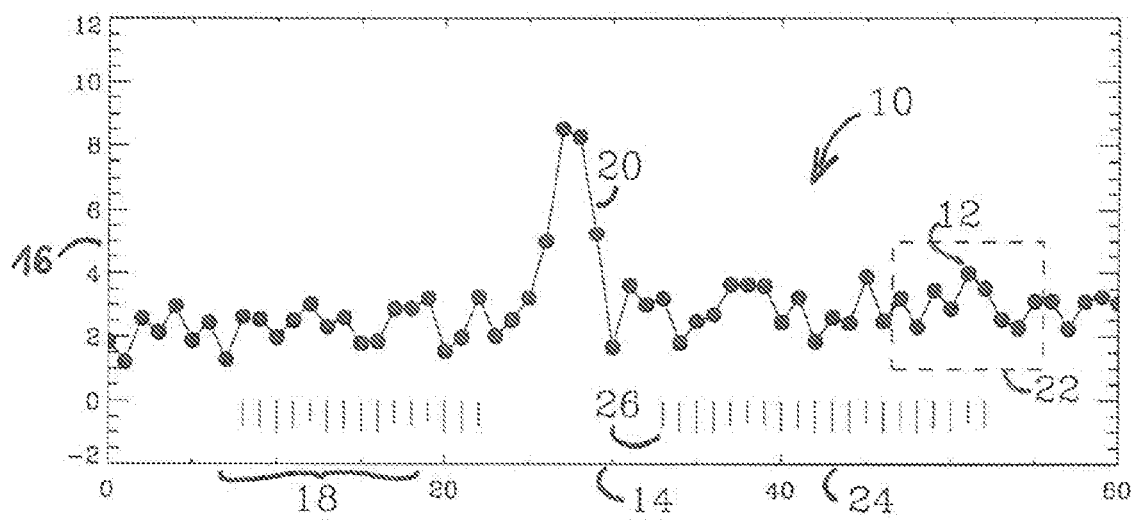
FIG. 2 shows an unprocessed spectrum of detected signal values.

FIG. 2 shows a spectrum generally designated with numeral 10. The spectrum 10 shows signal values 12 which are detected, for example, with a line detector with a plurality of linearly arranged detector elements. Accordingly, the abscissa 14 is provided with numbers representing the position of the detector elements in the line. Values representing the signal value are shown on the ordinate 16. Signal values ma he for example, intensities measured with a detector element.

The spectrum 10 is provided with ranges 18 where the signals extend very flat apart from some noise and which are presumably caused by background. A peak 20 can be recognized in the middle range.

It is an object of the automatized processing of this and any other spectrum to quantitatively determine the background and thereby enable a separation of bands (peaks).

In a first step the signal values are statistically analyzed. For this purpose a window width is selected. The present embodiment is carried out with a window width 9. An example with such a window width is illustrated in FIG. 2. The window designated with numeral 22 comprises a center point 12 and four points on either side, respectively, i.e. 9 points altogether.

Figure 3:
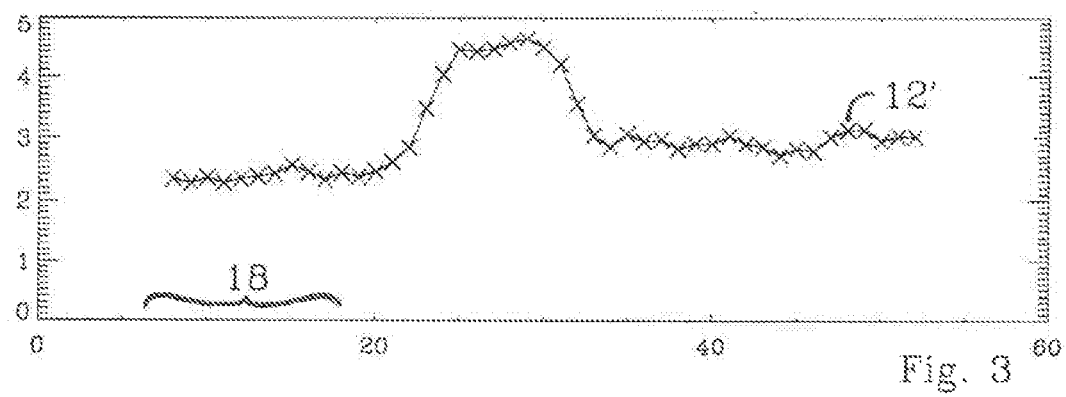
FIG. 3 shows a spectrum which is obtained from FIG. 2 with Function (A) moving average.

For calculating the first statistical moment, the average value—designated "function (A)" below—is calculated. The corresponding formula is designated with (1) in FIG. 1. The signal value 12 on point 24 is replaced by the average value of all points in the window 22 around this point 12. This procedure is repeated for all points. The result of such a calculation of the function (A) is represented in FIG. 3. It can be recognized that flat ranges 18 will remain flat furthermore. The peak 20, however, is flatter and wider. Individual spikes are removed.

Figure 4:
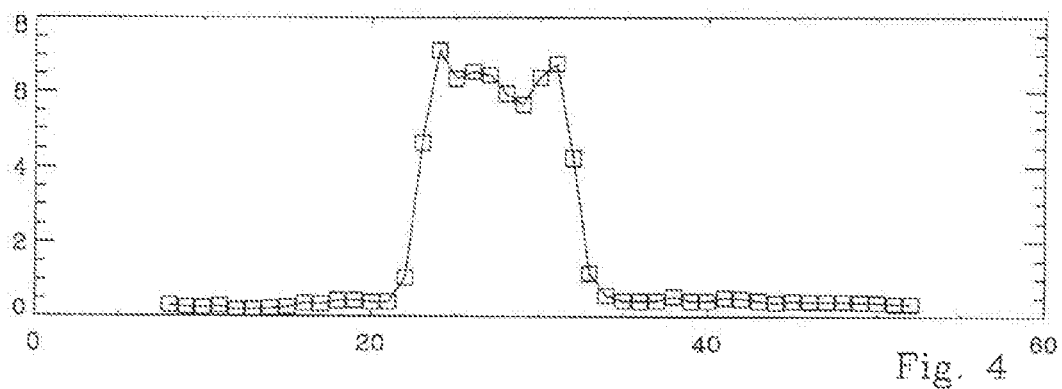
FIG. 4 shows a spectrum which is obtained from FIG. 2 with Function (B) variance.
Figure 5:
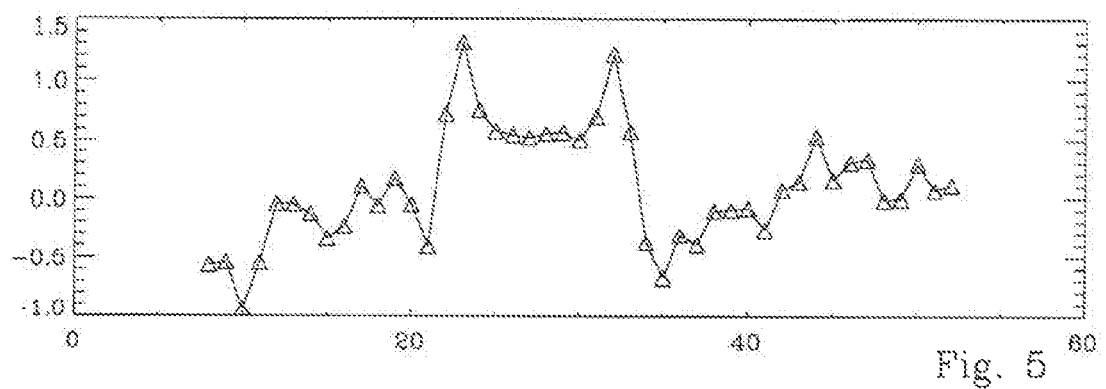
FIG. 5 shows a spectrum which is obtained from FIG. 2 with Function (C) skewness.
Figure 6:
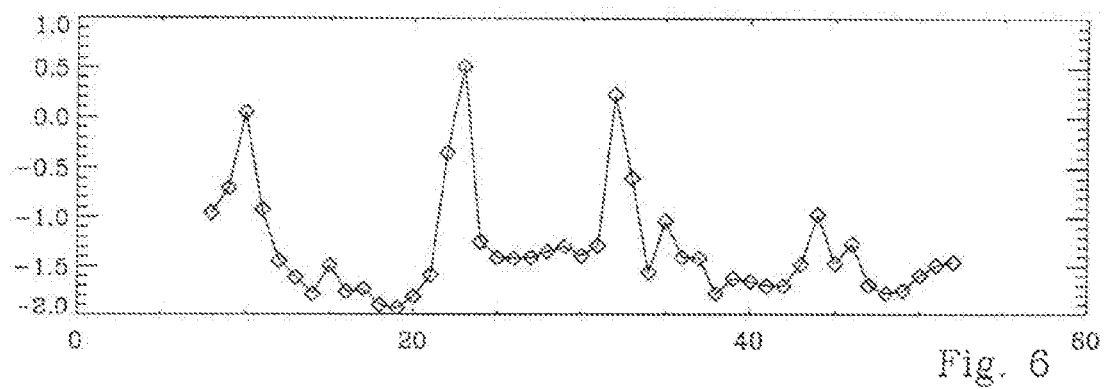
FIG. 6 shows a spectrum which is obtained from FIG. 2 with Function (D) kurtosis.

Further functions are calculated in addition to the moving average of function A the results of which are represented in FIGS. 4 to 14. The calculation of the variance designated as "function B" is calculated according to the formula represented in FIG. 1 (2). The result is shown in FIG. 4. The calculation of the skewness designated as "function C" is calculated according to the formula represented in FIG. 1 (3). The result is shown in FIG. 5. The calculation of the kurtosis designated as "function D" is calculated according to the formula represented in FIG. 1 (4). The result is shown in FIG. 6. In the formulas x designates the position of the point and N the width of the window which is, in the present case. N=9.

Figure 7:
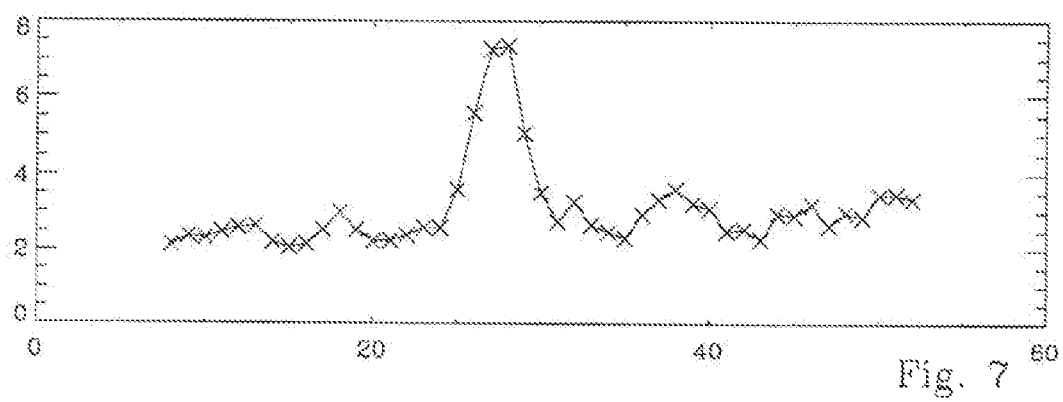
FIG. 7 shows a spectrum which is obtained from FIG. 2 with Function (E) moving average with a window width of points.

Further to the first four statistical momentums further functions are calculated:

Function (E) is the moving average with a window width of 3 points and corresponds to function A apart from the window width. The result of the calculation of function (E) is represented in FIG. 7. It can be recognized that a smaller window width causes less widening of the peak than a larger window width.

Figure 8:
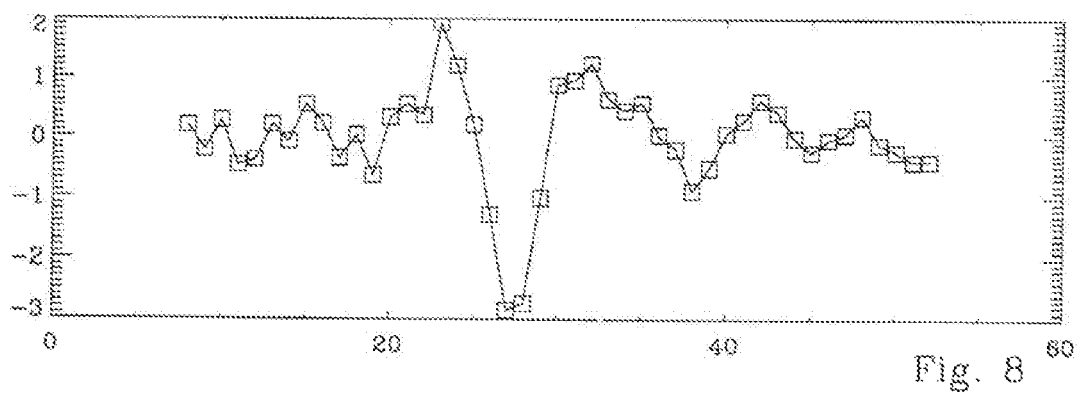
FIG. 8 shows a spectrum which is obtained front FIG. 2 with Function (F) second derivative.

Function (F) is the second derivative and describes the distribution of the curvature. The result of the calculation of function (F) is represented in FIG. 8.

Figure 9:
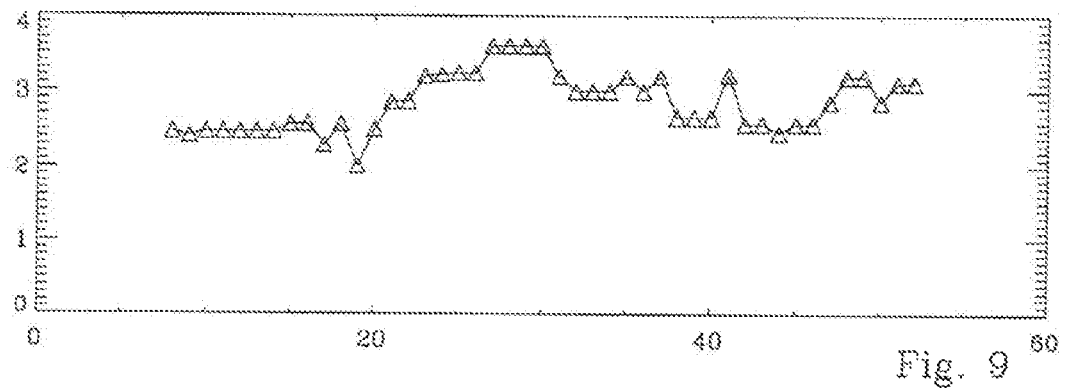
FIG. 9 shows a spectrum which is obtained from FIG. 2 with Function (G) median.

Function (G) is the median. It is determined as follows: the signal values in a window are sorted according to their size (value). The 5th-largest value, i.e. the one in the middle of the sorting, is the median at a window width of 9. The result of the calculation of function (G) is represented in FIG. 9.

Figure 10:
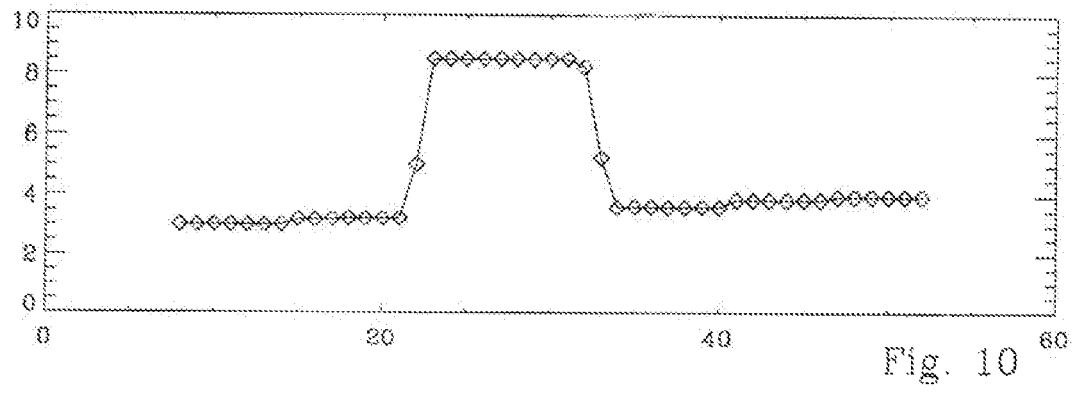
FIG. 10 shows a spectrum which is obtained from FIG. 2 with Function (H) maximum.

Function (H) is the maximum of all values in a window. The central value of the window is replaced by the maximum value even if it is at the edge of the window. Accordingly, a very smooth curve without any spikes is obtained. Peaks are broadened very much. The result of the calculation of function (H) is represented in FIG. 10.

Figure 11:
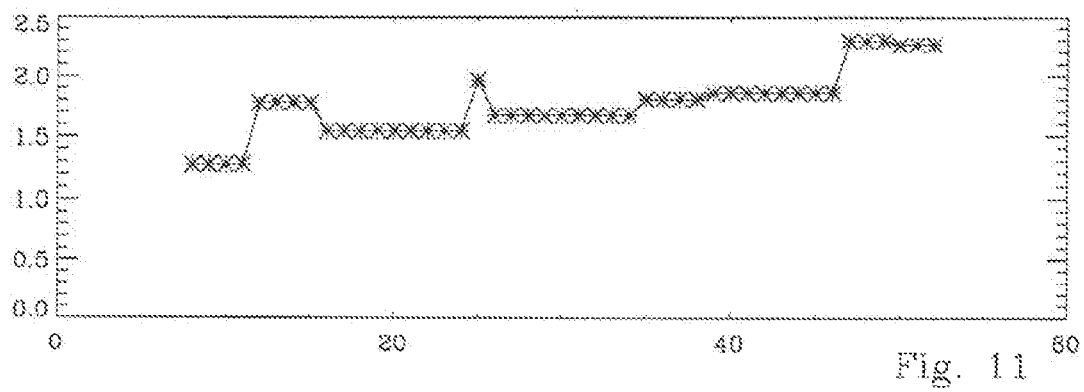
FIG. 11 shows a spectrum which is obtained from FIG. 2 with Function (I) minimum.

Function (I) is the minimum of all values in a window. The calculation is earned out in an analogue way as the calculation of the maximum value. The result of the calculation of function (I) is represented in FIG. 11.

Figure 12:
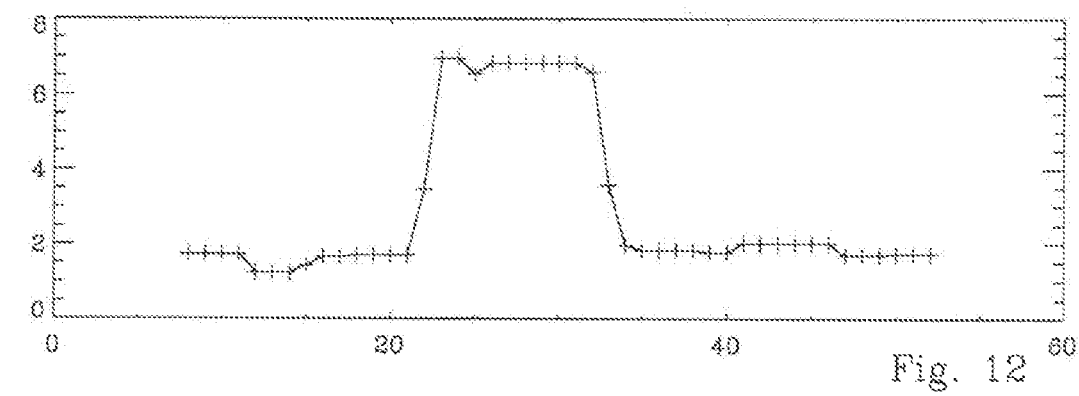
FIG. 12 shows a spectrum which is obtained from FIG. 2 with Function (J) difference between maximum and minimum.

Function (J) is the difference between maximum and minimum of all values in a window. The result of the calculation of function (J) is represented in FIG. 12.

Figure 13:
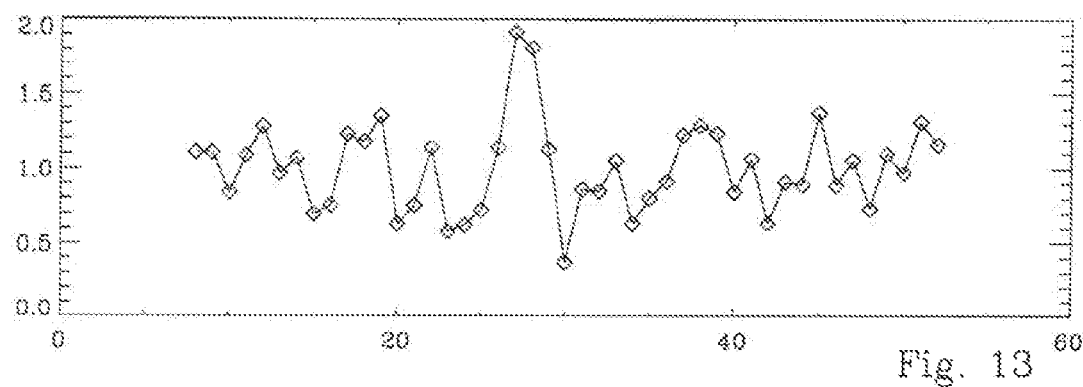
FIG. 13 shows a spectrum which is obtained front FIG. 2 with Function (K) quotient of the central signal value and the mean value.

Function (K) is the quotient of the central signal value and the mean value. The result of the calculation of function (K) is represented in FIG. 13.

Figure 14:
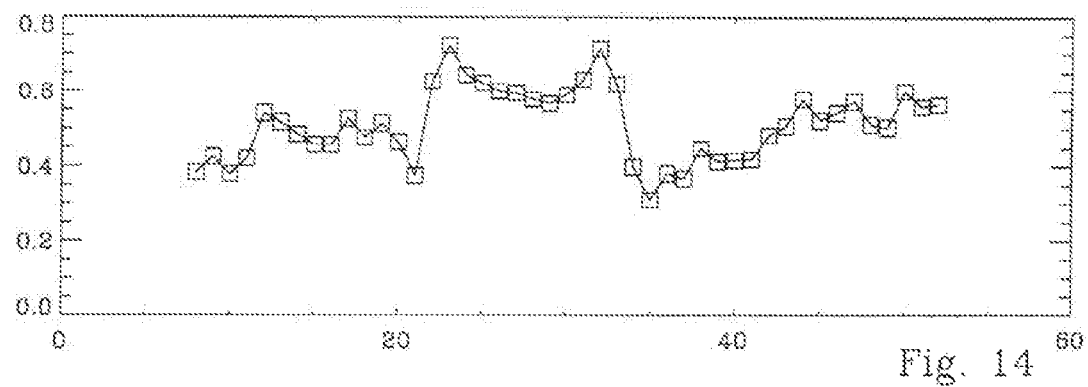
FIG. 14 shows a spectrum which is obtained from FIG. 2 with Function (L) quotient (maximum-mean value)/(maximum-minimum).
Figure 15:
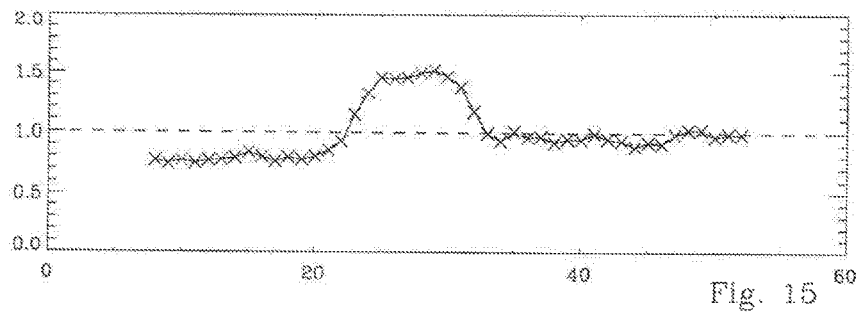
FIG. 15 shows a spectrum which is obtained from FIG. 2 with Function (A) moving average after normalizing.
Figure 16:
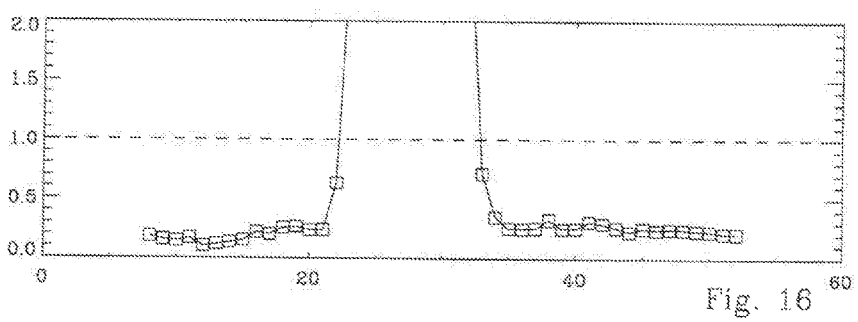
FIG. 16 shows a spectrum which is obtained from FIG. 2 with Function (B) variance after normalizing.
Figure 17:
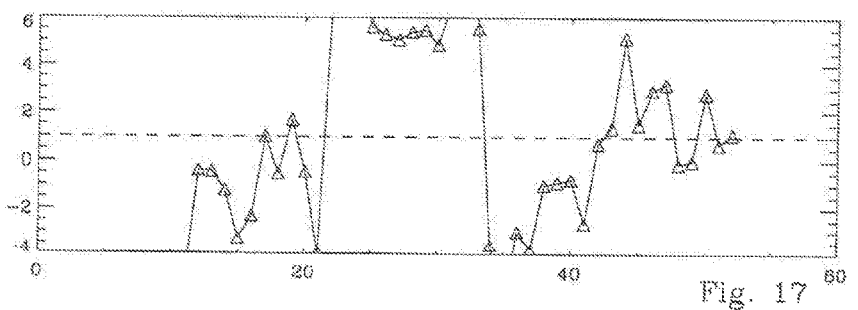
FIG. 17 shows a spectrum which is obtained from FIG. 2 with Function (C) skewness after normalizing.
Figure 18:
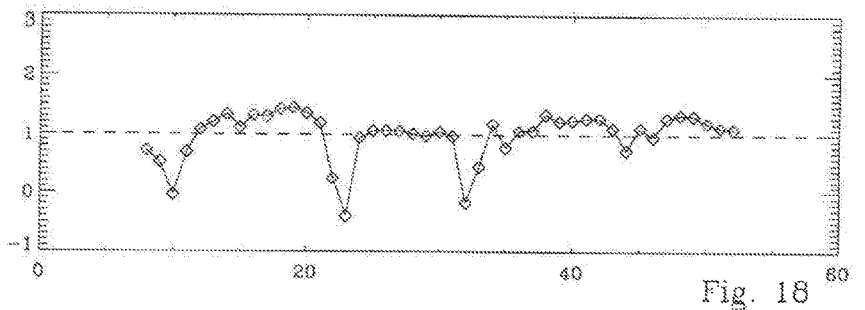
FIG. 18 shows a spectrum which is obtained from FIG. 2 with Function (D) kurtosis after normalizing.
Figure 19:
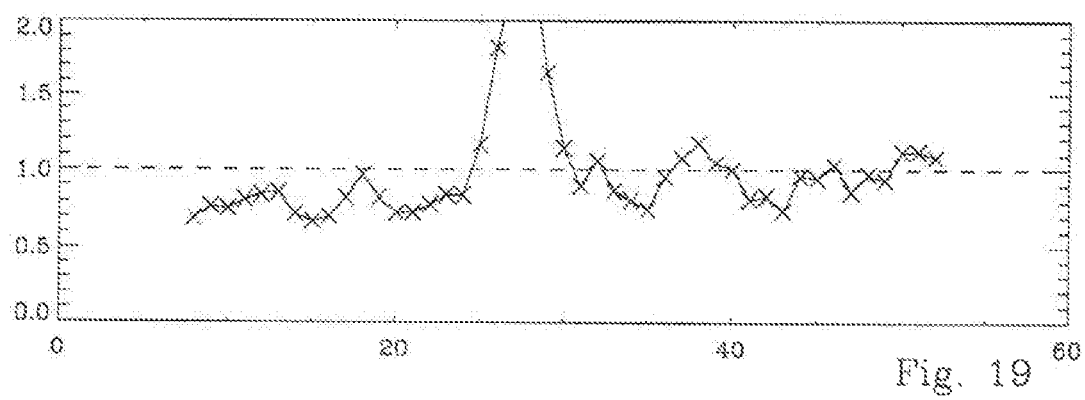
FIG. 19 shows a spectrum which is obtained from FIG. 2 with Function (E) moving average with a window width of 3 points after normalizing.
Figure 20:
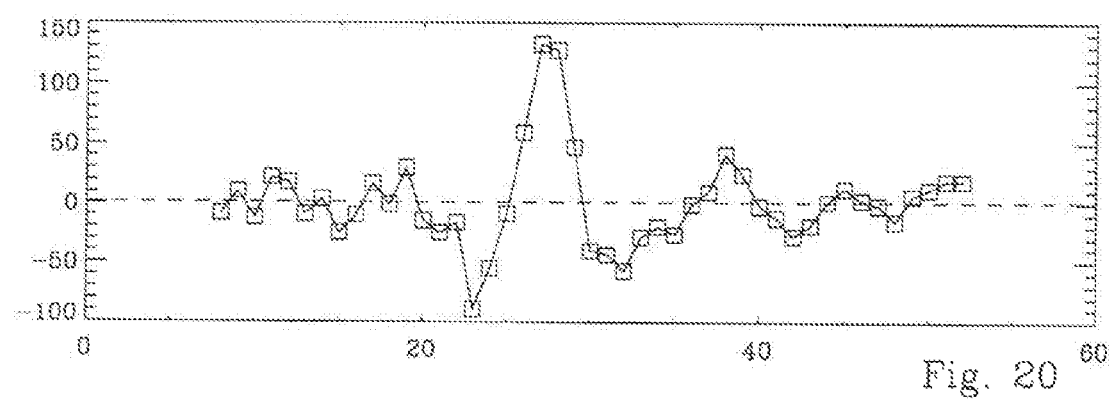
FIG. 20 shows a spectrum which is obtained from FIG. 2 with Function (F) second derivative after normalizing.
Figure 21:
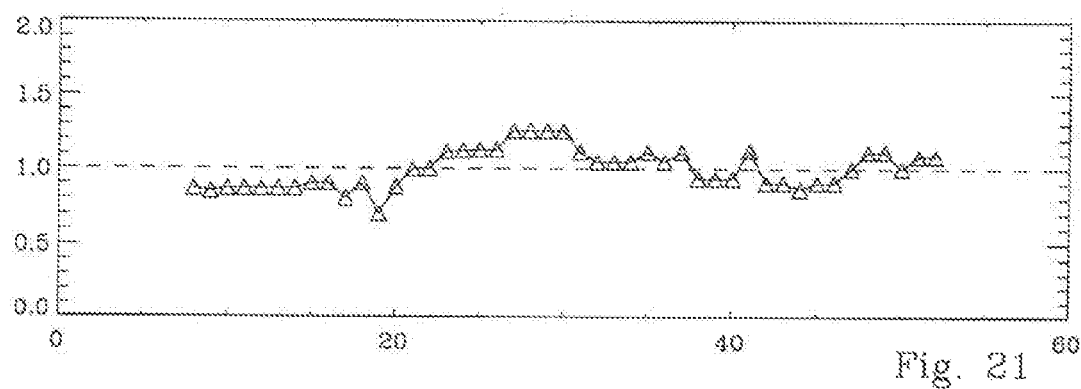
FIG. 21 shows a spectrum which is obtained from FIG. 2 with Function (G) median after normalizing.
Figure 22:
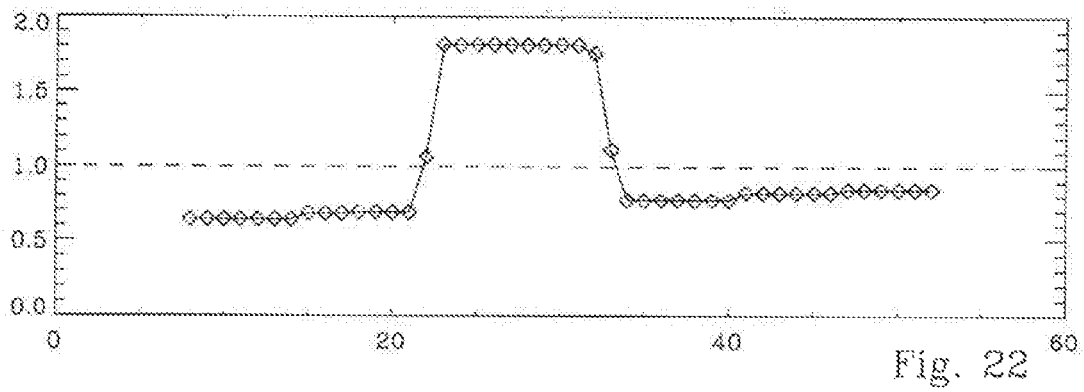
FIG. 22 shows a spectrum which is obtained from FIG. 2 with Function (H) maximum after normalizing.
Figure 23:
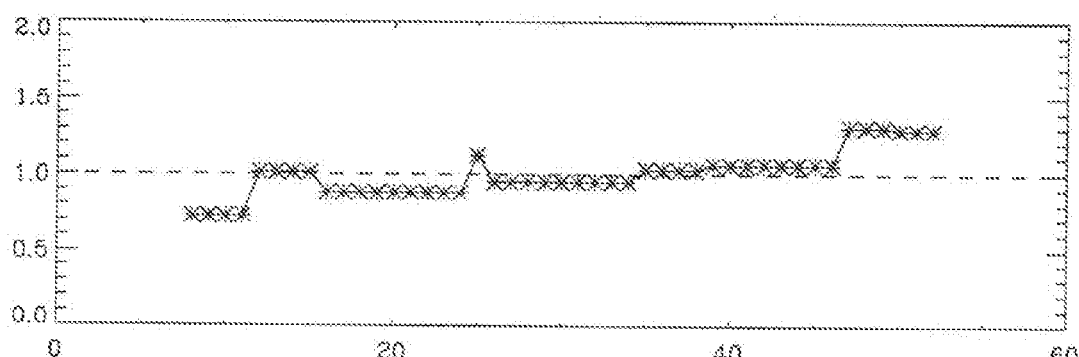
FIG. 23 shows a spectrum which is obtained from FIG. 2 with Function (I) minimum after normalizing.
Figure 24:
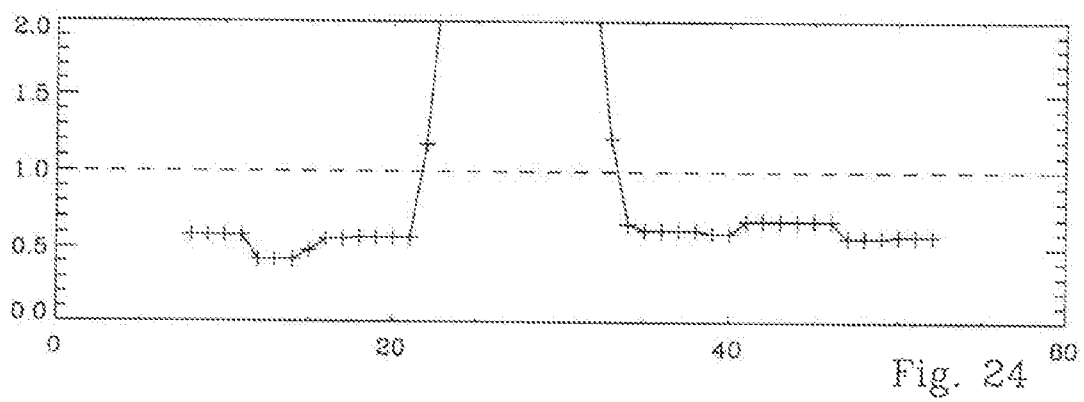
FIG. 24 shows a spectrum which is obtained from FIG. 2 with Function (J) difference between maximum and minimum after normalizing.
Figure 25:
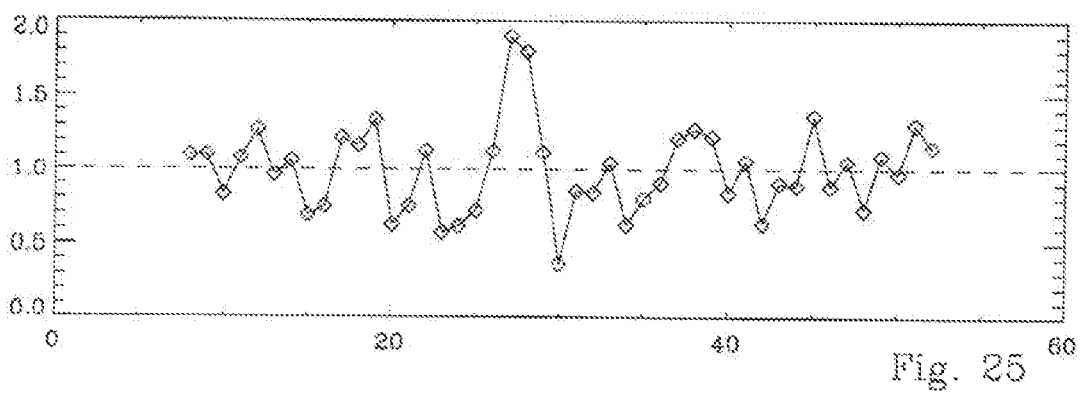
FIG. 25 shows a spectrum which is obtained from FIG. 2 with Function (K) quotient of the central signal value and the mean value after normalizing.
Figure 26:
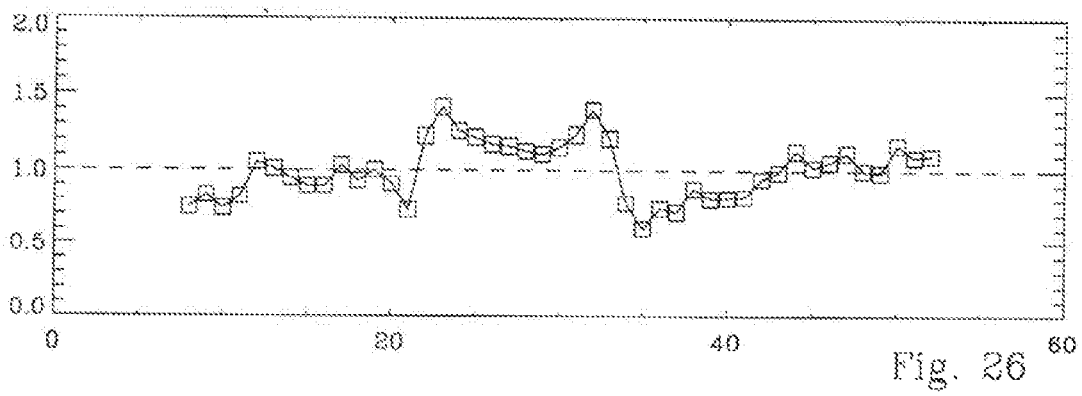
FIG. 26 shows a spectrum which is obtained from FIG. 2 with Function (L) quotient (maximum-mean value)/(maximum-minimum) after normalizing.
Figure 27:
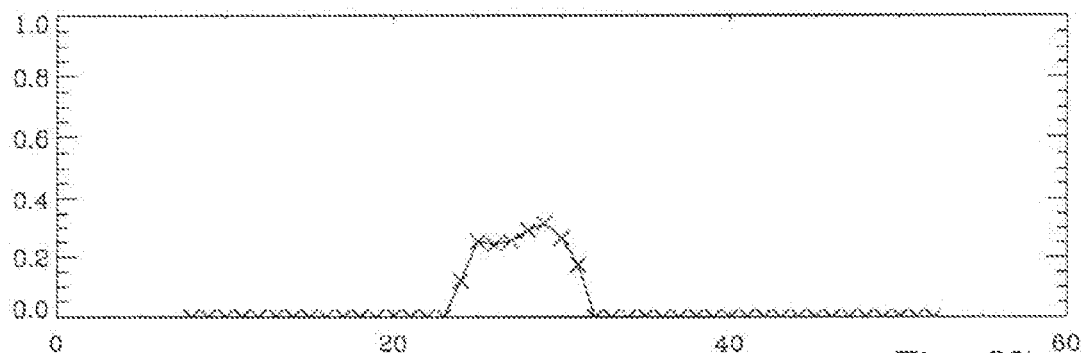
FIG. 27 shows a probability spectrum which is obtained by processing the spectrum shown in FIG. 15.
Figure 28:
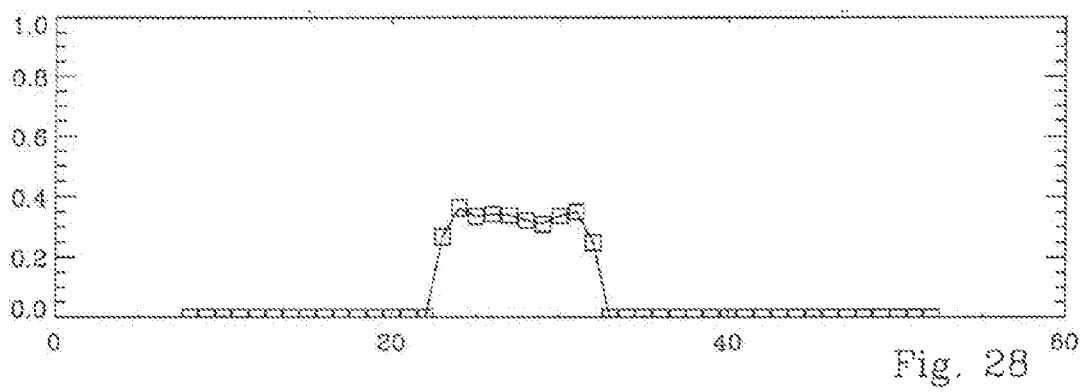
FIG. 28 shows a probability spectrum which is obtained by processing the spectrum shown in FIG. 16.
Figure 29:
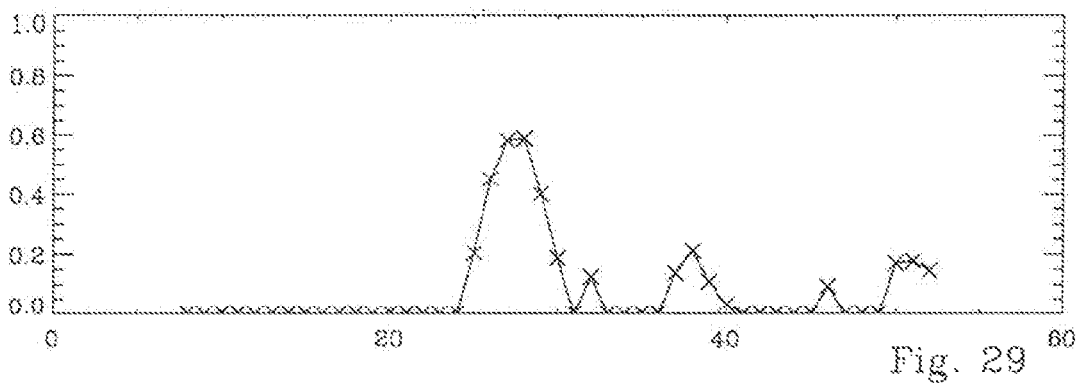
FIG. 29 shows a probability spectrum which is obtained by processing the spectrum shown in FIG. 19.
Figure 30:
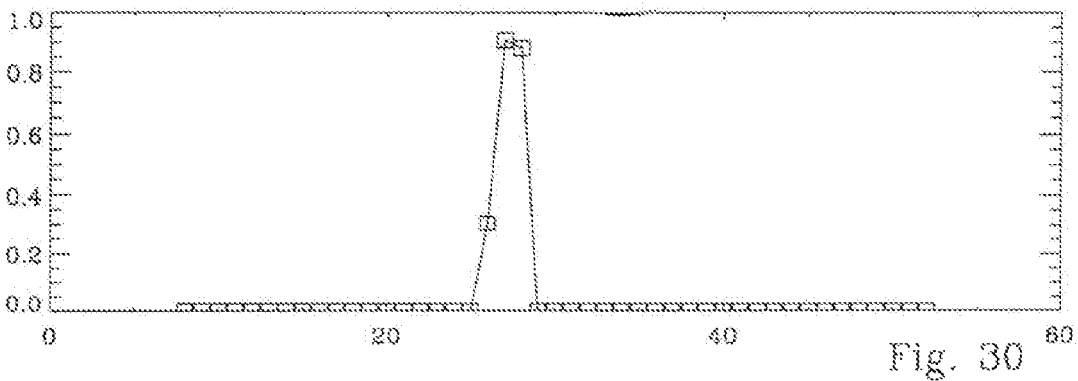
FIG. 30 shows a probability spectrum which is obtained by processing the spectrum shown in FIG. 20.
Figure 31:
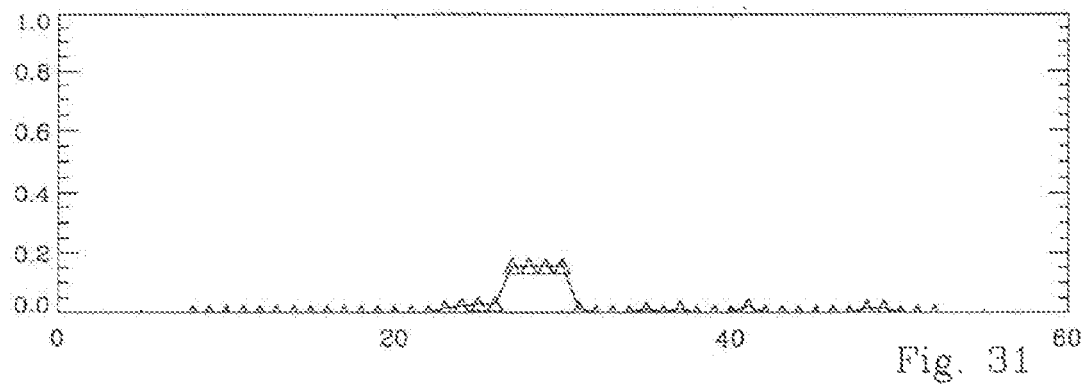
FIG. 31 shows a probability spectrum which is obtained by processing the spectrum shown in FIG. 21.
Figure 32:
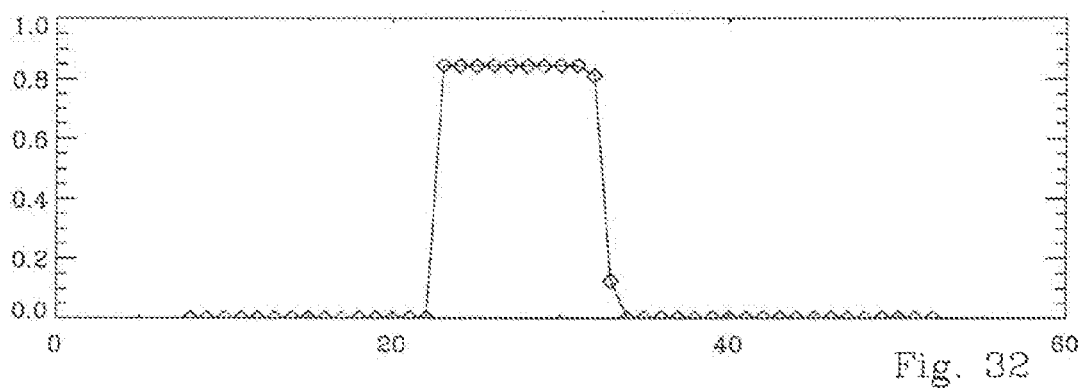
FIG. 32 shows a probability spectrum which is obtained by processing the spectrum shown in FIG. 22.
Figure 33:
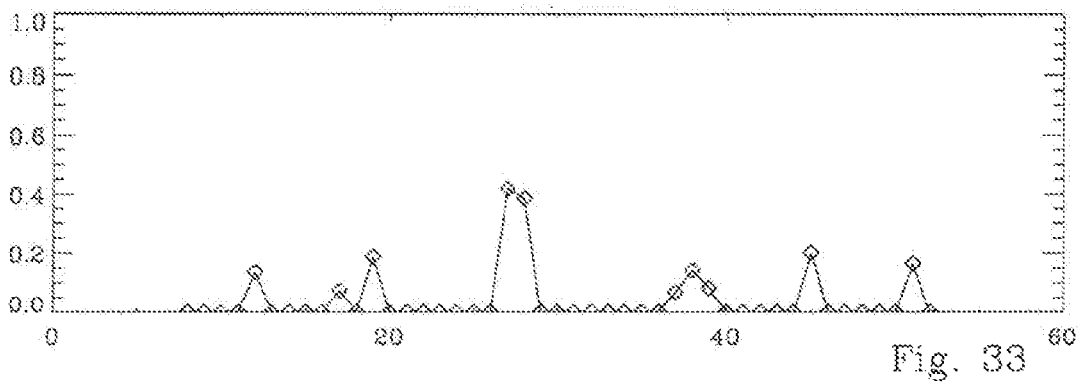
FIG. 33 shows a probability spectrum which is obtained by processing the spectrum shown in FIG. 25.

Function (L) is the quotient (maximum-mean value)/(maximum-minimum) of the values in one window. The result of the calculation of function (L) is represented in FIG. 14.

It can be easily recognized that the functions (A) to (L) have different Offsets. Therefore, the values are normalized by dividing them by the average value of all points of the functions. Thereby, it is achieved that the values vary about the value 1. The result is shown in FIGS. 15 to 26 for all functions (A) to (L).

Then, from the normalized values of the functions (A) to (L) probabilities $P_i(band)$ are calculated that the signal value at the respective point belongs to a band or peak. A probability is attributed to each point having a normalized parameter above or below a threshold S which is proportional, to the distance of the parameter from the threshold mentioned above. The threshold S is always in the range or 1 apart from one exception. Such exception relates to the function (F)=y", i.e. the second derivative. In this case S must be selected according to the structure of the bands in the spectrum: fine and narrow bands→S is selected to be a large value, wide or badly resolved bands→S is selected to be a small value. In principle the following applies:

$$P_i(band) = r_i * (function_{normalized} - S_i)^r,$$

wherein the proportionality factors $r_i$ are suitably selected, In as preferred embodiment of the method $r_i$ and $S_i$ have the following values:

| Function | r | S | t |
|---|---|---|---|
| A | 1.0 | 1.2 | 1 |
| B | 0.2 | 1.0 | ½ |
| C | 0.0 | 1.0 | 1 |
| D | 0.0 | 1.0 | 1 |
| E | 0.5 | 1.0 | ½ |
| F | 0.1 | 50 | ½ |
| G | 1.0 | 1.1 | 1 |
| H | 1.0 | 1.1 | ½ |
| I | 0.0 | 1.0 | 1 |
| J | 0.0 | 1.2 | ½ |
| K | 0.5 | 1.2 | ½ |
| L | 0.0 | 1.0 | 1 |

A value of r=0 indicates that the corresponding function is not considered when calculating a probability and will, therefore, not influence the background function. A value of t=½ indicates that a root is extracted from the distance (function-S).

It does not make sense for all spectra to use all functions. Therefore, in the present case the functions (C), (D), (I), (J) and (L) were not further processed. The probabilities $P_i$(band) for the presence of a band or peak calculated from the remaining normalized functions are shown in FIGS. 27 to 33. The peak 20 can be well recognized in all such figures.

Figure 34:
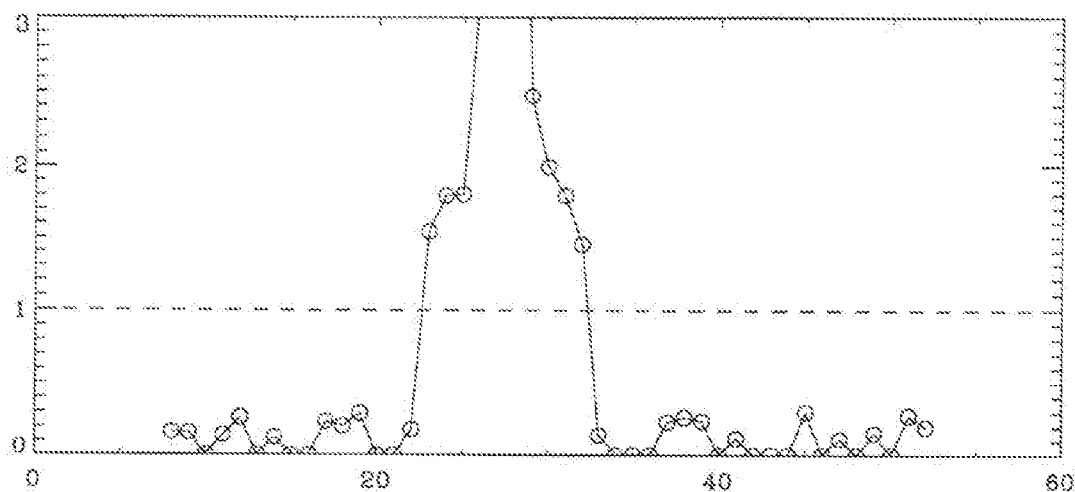
FIG. 34 shows a probability spectrum for the overall probability for the presence of bands or peaks which is obtained by adding up the probabilities of the spectra in FIGS. 27 to 33.

In a next step the probability values $P_i$(band), which are between 0 and 1, point wise added up for each point to an overall probability. It was found that some of the functions generally provide more relevant information than others. Therefore, the probabilities are multiplied with a factor $\alpha_i$ before calculating the sum to $\Sigma\alpha_i P_i$(band). The result is shown in FIG. 34.

Figure 35:
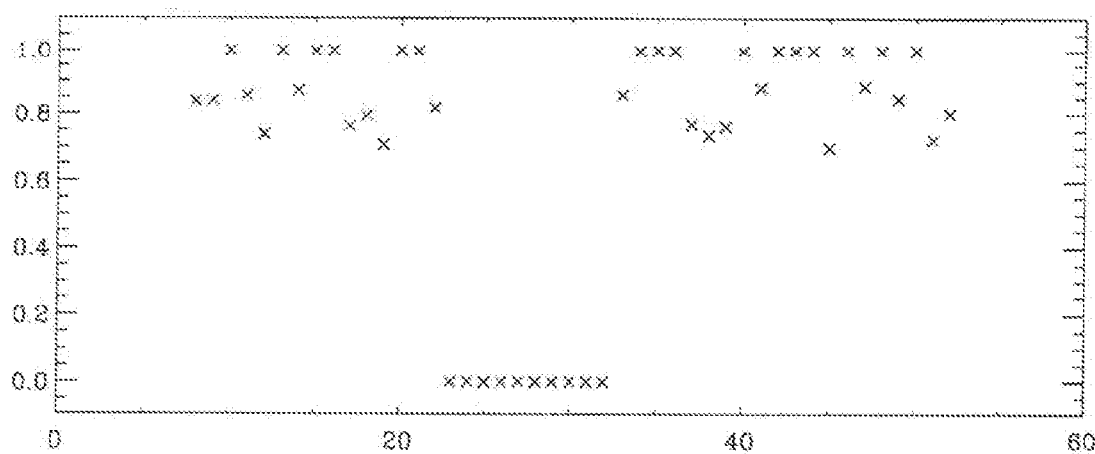
FIG. 35 shows a probability spectrum for the probability for the presence of background which is derived from the spectrum shown in FIG. 34.

The larger the probability $P_i$(band) that a point is part of a band or peak the smaller is the probability $P_i$(background) that it shows background. FIG. 35 shows the probability that background is present which is calculated according to $$P(\text{background}) = 1 - \Sigma P_i(\text{band})$$

Since probabilities are between 0 and 1 all negative values are set to zero. High values in FIG. 35 indicate that with a high probability there is only background present. In other words: each point in the spectrum has its own probability that there is only background. Such values are illustrated in FIG. 2 in the form of vertical bars 26. It can be recognized that there are no probabilities in the range of the peak 20 and indeed high probabilities are calculated for the flat range 18 to be caused by background. Such automatically calculated result, therefore, corresponds to the visual perception.

The described method in the present embodiment is repeated fix several window widths, such as, for example, window widths with 11, 13, 15 and 17 points. It is understood, however, that such values are mentioned by way of example only and that depending on the spectral resolution, the computing capacity and the peak widths entirely different values can be useful.

As a result there are several probabilities for each point of the spectrum which were determined with different window widths. The N probabilities are sorted according to their values. Finally the value in the center is selected which corresponds to the median. Thereby, a very high stability regarding spikes is achieved with the N probabilities. Such spikes would otherwise have strong effects on the final result (calculation of the average, addition of values etc.), In the following step a fit function is determined for the background. Such a fit function can be determined for the original spectrum. It is also possible to calculate a lit function for a spectrum which is shown in logarithmic form on one or both axes. From this for each selected window width of for example, 9, 13, 17 etc. points four functions can be derived. The fit functions are fitted by the method of least squares. Each point is taken into account only with the corresponding probability. Ranges where there is a peak are consequently not considered at all. The fit function which finally has the smallest error will be used for background correction.

Figure 36:
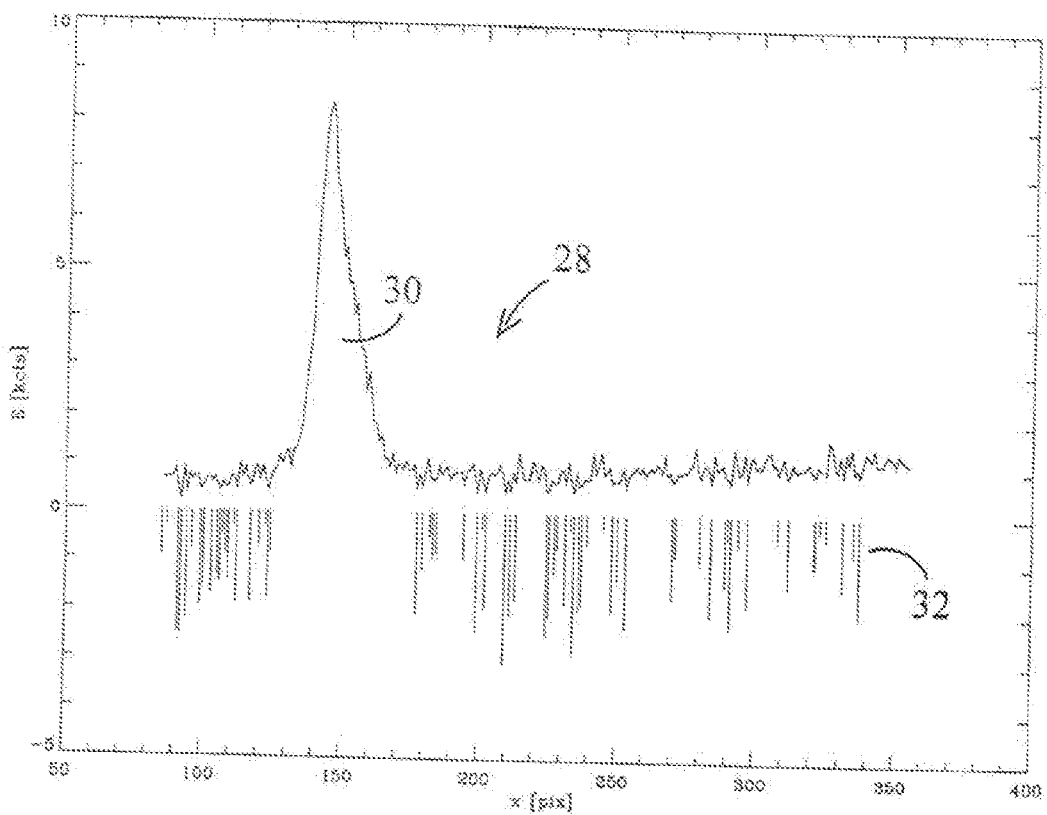
FIG. 36 shows an emission spectrum with a peak and background of a real sample and an illustration of the probabilities for a detector element being part of a band or peak or exclusively detecting a background signal.
Figure 37:
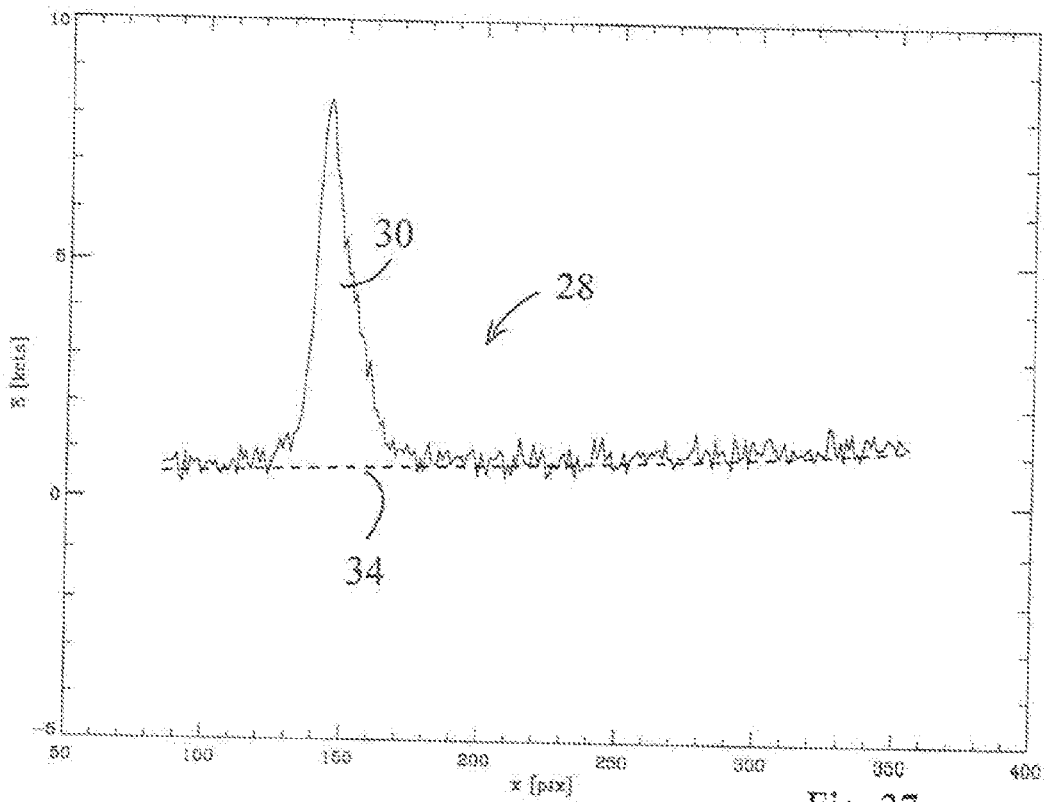
FIG. 37 shows the emission spectrum of FIG. 36 with a background fit.

A linear function was used in the present embodiment. It is, however, also possible to use polynomials with higher order or different functional relations. FIG. 36 shows a real spectrum 28 with a peak 30. A probability was attributed to each point of the spectrum according to the above method which is represented by a bar 32, if a probability is present at all. FIG. 37 shows the linear fit function 34 determined in the above described way. If such function 34 is subtracted from the signal values of the spectrum 28 it can be easily seen that apart from some small noise only the interesting peak remains. This can then be quantitatively evaluated.

The described method has the advantage that the background is automatically determined over the entire spectral distribution and not only locally. Thereby, a high reproducibility and accuracy can be achieved.

What is claimed is:

1. A method for the determination and correction of background signals in a spectrum to generate a background corrected spectrum for use in spectral analysis, comprising:
   obtaining a spectrum consisting of a plurality of signals, each signal forming a spectral point in said spectrum and having a signal value, some signal values in said spectrum representing background; and
   removing said signal values representing background to generate a background corrected spectrum, the method for removal of signal values representing background comprising calculating fit values for each of said signals, said fit values being generated by the steps of:
   (a) calculating function values according to at least three functions of said signal values, wherein said at least three functions are selected from:
   (A) mean;
   (B) variance;
   (C) skewness;
   (D) kurtosis;
   (E) moving average with a window width of 3 points;
   (F) second derivative;
   (G) median;
   (H) maximum;
   (I) minimum;
   (J) difference between maximum and minimum;
   (K) quotient of the central signal value and the mean value;
   (L) quotient (maximum-mean value)/(maximum-minimum);
   (b) normalizing said calculated function values by division by the mean value of the corresponding function values over all of said spectral points;
   (c) attributing probabilities $P_i$(band) for the presence of bands or peaks to each of said spectral points in each of said calculated function values wherein said probabilities $P_i$(band) are calculated by attributing a probability to each of said spectral points having a normalized value above or below a threshold, in particular above 1.3 and below 0.7, said attributed probability being proportional to the distance of said normalized value from said threshold;

(d) adding said probabilities $P_i(band)$ up to an overall probability $\Sigma P_i(band)$ from all of said calculated function values for each of said spectral points;

(e) calculating a probability P(background) for the presence of background for each of said spectral points from said overall probability $\Sigma P_i(band)$ according to $$P(background)=1-\Sigma P_i(band)$$

wherein negative values of P(background) are set to zero; and (f) calculating a fit of said signal values with fit values at all of said spectral points wherein said signal values in each of said spectral points is taken into account in the fit values only with said background probability calculated for said spectral point, and subtracting said fit values from said signal values of said spectrum thereby generating a background corrected spectrum;

making said background corrected spectrum available for spectral analysis in place of said spectrum.

2. The method of claim 1, and wherein said probabilities $P_i(band)$ are multiplied by a factor $\alpha_i$ before calculating said overall probability in such a way that the following equation applies:

$$P(background)=1-\Sigma \alpha_i P_i(band).$$

3. The method of claim 1, and wherein said fit is calculated by means of a fit-function and the method of least squares.

4. The method of claim 3, and wherein several fit functions of different type are used and the one with the smallest deviation of the least squares is selected.

5. The method of claim 1, and wherein a polynomial is used as a fit function for said fit.

6. The method of claim 3, and wherein said method is carried out a plurality of times for at least two different window widths, preferably for window widths having 5, 9, 13 and 17 adjacent spectral points and the one with the smallest deviation of the least squares is selected as a fit function.

7. The method of claim 1, and wherein the following functions are selected:
(A) mean
(B) variance
(E) moving average with a window width of 3 points
(F) second derivative
(G) median
(H) maximum
(J) difference between maximum and minimum
(K) quotient of the central signal value and the mean value.

8. The method of claim 1, and wherein the following functions are selected:
(A) mean
(B) variance
(E) moving average with a window width of 3 points
(F) second derivative
(G) median
(H) maximum.

9. A method for improving spectral analysis by generating a background corrected spectrum for use in spectral analysis, comprising:

obtaining a spectrum consisting of signals of a plurality of spectral points, said signals represented by signal values of respective points in said spectrum, some signal values in said spectrum representing background; and determining the signal values in said spectrum representing background comprising the steps of:

(a) selecting at least three functions to perform on the spectrum, wherein said at least three functions are selected from:
(A) mean;
(B) variance;
(C) skewness;
(D) kurtosis;
(E) moving average with a window width of 3 points;
(F) second derivative;
(G) median;
(H) maximum;
(I) minimum;
(J) difference between maximum and minimum;
(K) quotient of the central signal value and the mean value;
(L) quotient (maximum-mean value)/(maximum-minimum);

(b) selecting a window width and calculating function values using the selected window width for the spectrum according to each of the at least three selected functions;

(c) normalizing said calculated function values by division by the mean value of the corresponding function values over all of said spectral points;

(d) attributing probabilities $P_i(band)$ for the presence of bands or peaks to each of said spectral points in each of said calculated function values wherein said probabilities $P_i(band)$ are calculated by attributing a probability to each of said spectral points having a normalized value above or below a threshold, in particular above 1.3 and below 0.7, said attributed probability being proportional to the distance of said normalized value from said threshold;

(e) adding said probabilities $P_i(band)$ up to an overall probability $\Sigma P_i(band)$ from all of said calculated function values for each of said spectral points;

(f) calculating a probability P(background) for the presence of background for each of said spectral points from said overall probability $\Sigma P_i(band)$ according to $$P(background)=1-\Sigma P_i(band)$$

wherein negative values of P(background) are set to zero; and (g) calculating a fit of said signal values with fit values at all of said spectral points wherein said signal values in each of said spectral points is taken into account in the fit values only with said background probability calculated for said spectral point;

using the calculated fit values, subtracting said fit values from said signal values of said spectrum thereby removing said signal values representing background from said spectrum to generate a background corrected spectrum; and making said background corrected spectrum available for spectral analysis in place of said spectrum.

10. The method of claim 9, and wherein said probabilities $P_i(band)$ are multiplied by a factor $\alpha_1$ before calculating said overall probability in such a way that the following equation applies:

$$P(background)=1-\Sigma \alpha_i P_i(band).$$

11. The method of claim 9, wherein the window width for calculating function values is an odd number of points.

12. The method of claim 11, wherein the window width for calculating function values is chosen from a window width of 5, 9, 13, or 17 points.

* * * * *